No. 704,159. Patented July 8, 1902.
W. N. WHITELY & W. N. WHITELY, Jr.
BICYCLE HANDLE BAR.
(Application filed Jan. 23, 1900.)
(No Model.)
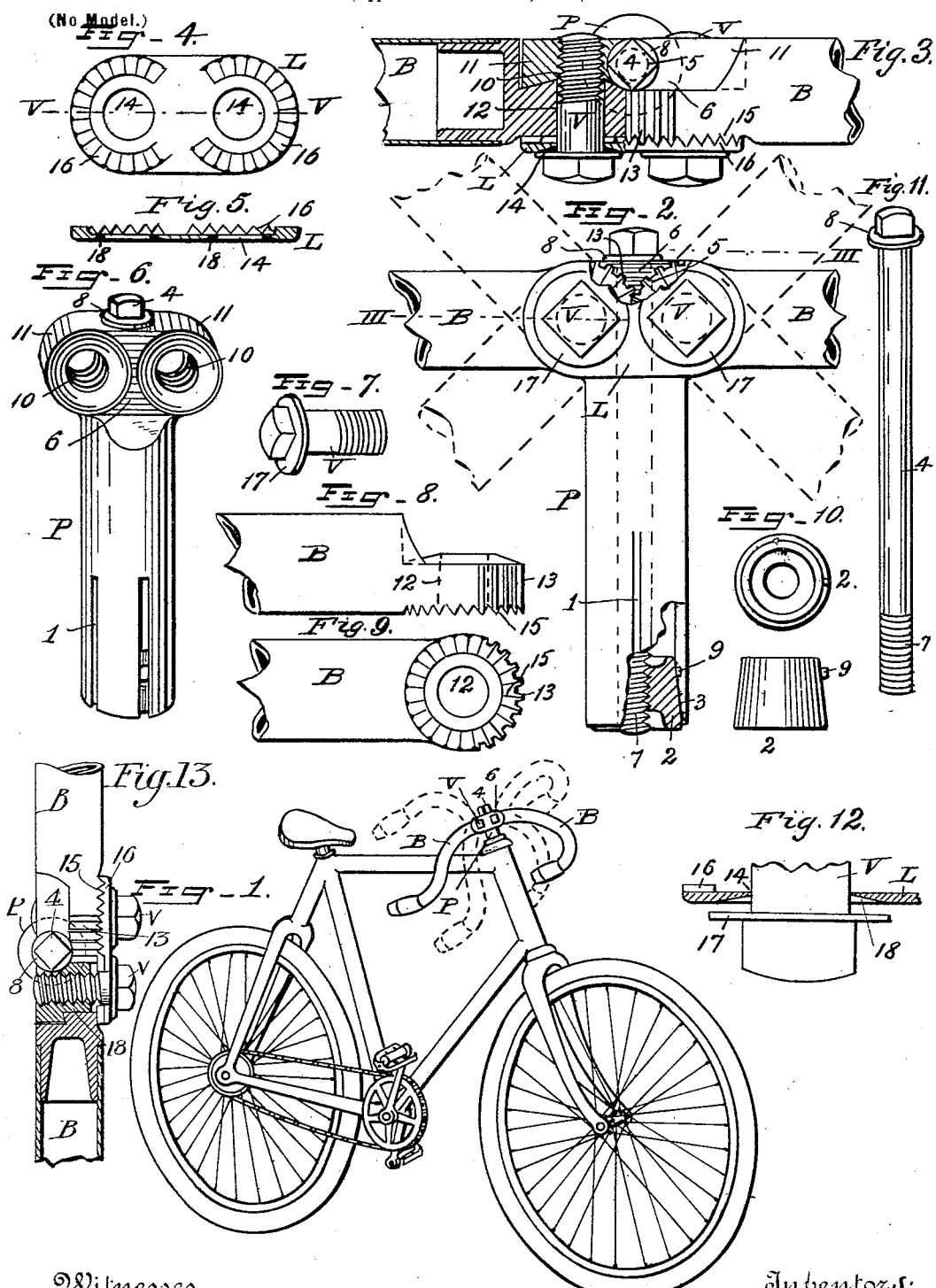
Witnesses
Geo. M. Copenhaver
Dorothy M. Marke
Inventors:
William N. Whitely
William N. Whitely, Jr.
By their Attorney
H. N. Low

UNITED STATES PATENT OFFICE.

WILLIAM N. WHITELY AND WILLIAM N. WHITELY, JR., OF SPRINGFIELD, OHIO.

BICYCLE HANDLE-BAR.

SPECIFICATION forming part of Letters Patent No. 704,159, dated July 8, 1902.

Application filed January 23, 1900. Serial No. 2,499. (No model.)

*To all whom it may concern:*

Be it known that we, WILLIAM N. WHITELY and WILLIAM N. WHITELY, Jr., citizens of the United States, residing at Springfield, in the county of Clark and State of Ohio, have invented certain new and useful Improvements in Bicycle Handle-Bars; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to bicycle handle-bars and to the means for adjusting and securing the handle-bars and post, the principal object of which is to produce a simple, positive, and easily-operated clamp for the bars.

The invention further relates to means for securing the clamping parts from accidental loosening and to a means for readily and securely clamping the handle-bar post in the steering-fork stem of the bicycle, such means for clamping the post being so arranged as to be entirely independent of the handle-bars or of their adjusting and clamping means.

In order to make our invention more clearly understood, we have shown in the accompanying drawings means for carrying the same into practical effect without limiting our improvements in their useful applications to the particular constructions which for the sake of illustration we have delineated.

In said drawings, Figure 1 is a perspective view of a bicycle embodying our invention and illustrating some of the adjustments of the handle-bars. Fig. 2 is a rear elevation, partly in section, of the handle-bar post and portions of the handle-bars, illustrating by dotted lines some of the adjustments of the latter. Fig. 3 is a horizontal sectional view and plan on line 111 111, Fig. 2. Fig. 4 is an inner face view of the link which serves to connect the handle-bar pivots and to clamp the bars. Fig. 5 is a sectional view of the same on line *v v*, Fig. 4. Fig. 6 is a perspective view of the handle-bar post. Fig. 7 is a perspective view of one form of the clamping-bolts for the link and handle-bars. Fig. 8 is a plan view of the inner end of one handle-bar. Fig. 9 is a rear view of the same. Fig. 10 shows by a plan and elevation one form of a clamp for the handle-bar post. Fig. 11 is a perspective view of the clamp-actuating rod for the same. Fig. 12 is a horizontal sectional view of a portion of the clamping-link and a clamping-bolt on a larger scale. Fig. 13 is a side elevation, partly in section, of a modified form of the head of the handle-bar post, showing the handle-bar fitting over a trunnion.

Referring to the drawings, P indicates the handle-bar post, preferably adapted to be clamped within the steering-fork stem of the bicycle, shown in Fig. 1 as by slots 1, which allow the lower end of the post to be expanded tightly against the inner walls of the hollow steering-fork stem (not shown) by means of an expander-clamp 2, which fits within the beveled end 3 of the post. Said clamp is actuated by means of the longitudinal rod 4, which is held in position in the post by means of its shoulder 8. The rod 4 fits loosely in the perforation 5 of the head 6. Movement is imparted to the clamp 2 when the rod 4 is turned by means of a screw-thread connection 7 between the rod and clamp, as illustrated. Said screw-thread 7 is formed on the lower end of the rod 4 and engages a corresponding screw-thread on the clamp 2. The clamp 2 is held from turning within the beveled end of the post by means of a projection 9, which engages a suitable groove or slot in the lower end of the post. The clamp 2 may be of any suitable form adapted to be operated by the rod 4.

With the above-described clamping means for the post we have combined individually-pivoted vertically-adjustable handle-bars B B. The handle-bars B B are preferably supported on trunnions 18, formed of or rigid with the post-head, and are so arranged as to their adjusting and securing means as to be entirely independent of the adjusting means for the post. The inner ends of the bars B B may simply fit against the sides of the projections 11 of the head and be supported solely on the clamping-bolts V V. However, the form of support for the bars shown in Fig. 13, in which the handle-bars B B are supported on trunnions 13, is the preferred construction, as the clamping-bolts V V are thus relieved of the strain which would otherwise fall on them if they were the sole pivotal and supporting means for the handle-bars. Ease of adjustment is also facilitated by the employment of the trunnions shown in Fig. 13, as when making adjustment of the bars the trunnions support them and relieve the bolts V V of the twisting strain which would fall upon them if the weight of the bars was allowed to rest thereon. The bolts V pass through the eyes of the link L and the bearings 12 of the handle-bars and have engagement with the projections 11 of the head 6 by means of the screw-thread 10. The inner ends of the bars preferably, but not necessarily, have intermeshing gear-segments 13, by which they are carried in adjustment to move in unison. One of the principal features of this part of our invention consists in a link L, which unites the inner ends of the handle-bars. The link L engages, by means of corrugations 16, with corresponding corrugations 15 around the bearing-apertures 12 of the inner ends of the handle-bars. The head 6 of the post is preferably formed with projecting ears 11, with which the bolts V have screw-thread engagement, as at 10. The vertical perforation 5 of the head permits the introduction of the rod 4 independently of the handle-bars or their adjusting or securing means. To obtain a better supporting effect for the handle-bars, the projecting ears 11 of the head 6 are formed with concavities, and the handle-bar ends fit the same by means of convex formation. As illustrated, the handle-bars are fitted against the rear face of the head of the post, and it will be understood that it is not material to our invention whether they are so secured to the front or rear face of said post. The link L when the parts are assembled lies between the shoulders 17 of the bolts V and the corrugated rear faces of the handle-bars.

When the bolts V are loosened sufficiently to disengage the corrugations 16 of the link L from the corresponding corrugations 15 of the bars B B, the handle-bars may be turned upon their pivotal means to any desired vertical height of adjustment, whereupon by screwing up the clamping-bolts V (or the equivalent nuts which may be employed in their stead) the link L will be caused to reengage and unite the bars and force them tightly against the head of the post and there hold them rigidly in the desired adjustment. In the process of adjustment of the handle-bars the operator has full view of the corrugations on both link and bars. Thus engagement of the interlocking parts may be effected without liability of injury to the corrugations on link and bars, which might result if the parts were hidden from view during adjustment. It is further desirable to provide at a suitable point an elastic part or member, the resilience of which will prevent the accidental or unintentional loosening of the adjustment of the bars. We preferably effect this result by causing the bolt V and the link L to engage one another through an elastic shoulder 17 of the bolt V, as shown in Fig. 12. In order to effect a deflection of the shoulder 17, the engaging face of the link around each eye is formed with a concavity, as indicated at 18. When the bolt is screwed up to its clamping position, it first engages the link L by the periphery of its shoulder 17, and a further screwing up of the bolt V causes said shoulder to be slightly deflected. Thus the resilience of the shoulder 17 causes a secure frictional engagement with the heavy non-yielding link L.

By means of the direct insertion of the clamping-bolts V V centrally through the eyes of the corrugated locking-link L we have produced a novel construction for securing the adjustment of individually-pivoted vertically-adjustable handle-bars capable of being so securely clamped in any desired adjustment as to be, in effect, practically one continuous bar. Heretofore in simultaneously adjusting bicycle handle-bars having independent pivotal centers an adjustment has been sought changeable at the will of the rider while in motion; but the necessary rigidity of the adjusted bars did not obtain. The looseness of the bars after adjustment causes much annoyance to the rider, and the sense of security to be found in a rigid construction has always been lacking in the so-called "quick-adjusting" handle-bar type. The locking means for securing the adjustment of the bars which have heretofore been employed lack also the simplicity of construction which is greatly desirable. The safety and comfort of the rider are of the utmost importance. Our invention combines the simplicity of construction and ease and security of adjustment which are necessary to these ends.

What we claim is—

1. In a bicycle-handle-bar construction, in combination with the handle-bar post, of vertically-adjustable handle-bars, separately and pivotally mounted upon said post, a link, corrugated upon its face around its eyes, engaging the handle-bars by similar corrugations upon their faces, two separate and independent screw-threaded pivotal clamping-bolts passing through the eyes of said link and bearing-apertures of said bars and having screw-threaded connection with said post; said link and bolts forming the supporting and adjusting means of the bars upon said post.

2. In a bicycle-handle-bar construction, in combination with the handle-bar post, of vertically-adjustable handle-bars, separately and pivotally mounted upon said post and geared together, one bar controlling its fellow bar to move in unison, a link corrugated upon its face around its eyes, engaging the bars upon their faces by similar corrugations, and interlocking with each bar opposite the post, said link connecting each bar directly to the pivot of the other bar by two separate and independent screw-threaded pivotal clamping-bolts passing through the eyes of said link and the bearing-apertures of said bars and having screw-thread connection with said post; said link and bolts forming the supporting and adjusting means of said bars upon said post that the adjustable handle-bar members shall be as one continuous piece when adjusted and clamped together by said bolts and said corrugated link.

3. In a bicycle-handle-bar construction, in combination with the vertically-adjustable handle-bar post, having binding contact with the hollow steering-fork stem, of vertically-adjustable handle-bars having intermeshing gear-segments on their inner ends, said bars being individually and pivotally mounted on said post on separate centers, a clamp within the post, a rod for operating said clamp passing longitudinally and centrally throughout said post clearly to one side of the geared ends of said bars, a connecting-link corrugated around its eyes engaging corresponding corrugated faces on said bars, two clamping-bolts for clamping said link and bars to said post to permit of vertical adjustment of the handle-bars and vertical adjustment of the handle-bar post independently of each other.

4. In a bicycle-handle-bar construction, in combination, a handle-bar post, and integral therewith a head having ear projections 11 suitably formed to support two vertically-adjustable handle-bars upon said ear projections 11, the handle-bar post being longitudinally perforated, said handle-bars intermeshing with each other at their meeting ends by means of gear-segments, a clamp-actuating rod passing through said longitudinal perforation between said ears 11 and centrally of said post independent of said bars and entirely to one side thereof, an expander-clamp within the post operated by the clamp-actuating rod; said bars secured to said ears 11 by pivotal clamping-bolts and held against rotation by means of a corrugated link engaging similar corrugations upon the faces of the bars, the eyes of said corrugated link inclosing each of said clamping-bolts.

5. In a bicycle-handle-bar construction, the combination of a handle-bar post longitudinally perforated, and integral therewith the head having suitably-formed lateral ear projections, vertically-adjustable handle-bars externally secured to one side thereof, said bars intermeshing with each other at their meeting ends by means of gear-segments, a handle-bar-post clamp-actuating rod passing through said longitudinal perforation between said ears and centrally of said post, independent of said bars and entirely to one side thereof; said bars secured to said ears by clamping-bolts and held from rotation by means of a corrugated connecting-link and by similar corrugations upon their faces, the eyes of said link inclosing each of the two clamping-bolts, and the bars and post secured in any desired adjustment, substantially as described.

6. In a bicycle-handle-bar construction, in combination, a handle-bar post having a head suitably formed with ear projections, two handle-bars individually and separately mounted upon said ears, and geared together to move in unison during adjustment, said ears and said bars having smooth-faced concave and convex surfaces, respectively, engaging each other at the rotative centers of the bars, a connecting corrugated faced link extending from one of said centers to the other, surrounding screw-threaded clamping-bolts at each center of said bars, said bolts passing through said link and bars and having screw-thread connection with said ears to hold said bars rigidly together when adjusted.

7. The combination with a handle-bar post of two vertically-adjustable handle-bars pivoted thereon on trunnions integral with said post, and means for clamping the handle-bars in fixed position relative to said post consisting of a link having corrugations engaging corresponding corrugations on the ends of the handle-bars and screw-threaded bolts for clamping said link in engagement with the handle-bars, of an actuating-rod passing longitudinally through said post from top to bottom, and a clamp at the lower end of said rod within the post for the adjustment thereof, as and for the purposes shown and described.

In testimony whereof we affix our signatures in presence of two witnesses.

WILLIAM N. WHITELY.
WILLIAM N. WHITELY, Jr.

Witnesses:
H. N. Low,
Wm. H. De Lacy.